E. CRAIG.
MACHINE FOR MAKING BUTTER DISHES.
APPLICATION FILED OCT. 30, 1903.

1,113,879.

Patented Oct. 13, 1914.
9 SHEETS—SHEET 2.

Fig.2.

Witnesses:
Robert H. Weir
C. M. Nennich

Inventor:
Edward Craig
By Bulkley & Durand
Attorneys

E. CRAIG.
MACHINE FOR MAKING BUTTER DISHES.
APPLICATION FILED OCT. 30, 1903.

1,113,879.

Patented Oct. 13, 1914.
9 SHEETS—SHEET 3.

Fig. 3.

Witnesses:
Robert H. Weir
O. M. Nennich

Inventor:
Edward Craig
By Bulkley & Durant
Attorneys

E. CRAIG.
MACHINE FOR MAKING BUTTER DISHES.
APPLICATION FILED OCT. 30, 1903.

1,113,879.

Patented Oct. 13, 1914.
9 SHEETS—SHEET 6.

E. CRAIG.
MACHINE FOR MAKING BUTTER DISHES.
APPLICATION FILED OCT. 30, 1903.

1,113,879.

Patented Oct. 13, 1914.
9 SHEETS—SHEET 7.

E. CRAIG.
MACHINE FOR MAKING BUTTER DISHES.
APPLICATION FILED OCT. 30, 1903.

1,113,879.

Patented Oct. 13, 1914.
9 SHEETS—SHEET 8.

UNITED STATES PATENT OFFICE.

EDWARD CRAIG, OF ST. JOSEPH, MICHIGAN, ASSIGNOR, BY MESNE ASSIGNMENTS, TO SARANAC MACHINE CO., OF ST. JOSEPH, MICHIGAN, A CORPORATION OF MICHIGAN.

MACHINE FOR MAKING BUTTER-DISHES.

1,113,879.    Specification of Letters Patent.    Patented Oct. 13, 1914.

Application filed October 30, 1903. Serial No. 179,152.

*To all whom it may concern:*

Be it known that I, EDWARD CRAIG, a citizen of the United States of America, and resident of St. Joseph, Berrien county, Michigan, have invented a certain new and useful Improvement in Machines for Making Butter-Dishes, of which the following is a specification.

My invention contemplates an improved and highly efficient machine for automatically converting wood veneer or paper or other suitable sheet material into butter dishes or trays of any desired or well known pattern.

Generally stated, the object of my invention is the provision of a simple, compact, and highly efficient and practical machine for making butter dishes or trays of any suitable, known, or approved form or pattern.

A special object of my invention is the provision of an improved construction and arrangement whereby a machine of this character may be run at high speed without danger of breakage, and with practical certainty of the production of perfect trays, and with comparatively little noise and vibration.

Another object is the provision of a simplified and improved arrangement for feeding the wood veneer or paper.

A further object is the provision of a novel and improved cam and eccentric arrangement for operating both the feeding and forming and stapling devices.

Another object is the provision of an improved construction and arrangement of the dies and the means for forming the material into dish or tray form.

A further object is the provision of an improved construction and arrangement of the knives and cutting mechanism for shaping the blanks from which the dishes or trays are made.

It is also an object to provide certain details and features of improvement tending to increase the general efficiency and serviceability of an automatic butter dish machine of this particular character.

To the foregoing and other useful ends my invention consists in matters herein set forth and claimed.

In the accompanying drawings.

As thus illustrated, my invention comprises a frame or body A, adapted to provide bearings for the different shafts and movable parts of the machine, and adapted to support certain of the operative parts in suitably elevated positions. A driven shaft B is mounted in suitable bearings in the frame or body, and is gear-connected, through the medium of a pinion $b$ and a gear $b'$, with the driving-shaft C. A pulley D and other suitable arrangements can be employed for driving the shaft B. The shaft C is mounted in bearings $c$ in the frame or body and, as a means for reciprocating the knives, is provided at each end with eccentrically arranged pins or reduced end portions $c'$. These eccentric portions $c'$ are of less diameter than the body of the shaft, although integral therewith, and are adapted to rotate in blocks $c^2$, which latter are in turn adapted to reciprocate horizontally in the lower ends of the vertically reciprocating side members E of the frame whereon the knives are mounted. These members E are mounted to slide in ways formed by bolting the pieces $a$ to the sides of the frame or body, and are provided at their lower ends with openings $a'$ providing ways for the horizontal reciprocation of the blocks $c^2$. Thus, through the medium of the eccentric portions $c'$ and the blocks $c^2$, the rotation of the shaft C is converted into an even and smooth up-and-down motion or reciprocation on the part of the members E of the frame which carries the knives for cutting the blanks. The said means for cutting the blanks comprises a horizontal cross-piece $e$ adapted to rigidly connect the upper end portions of the side members E, and adapted to serve as the means for supporting and giving a vertical reciprocation to the block or carrier $e'$ to which the knives are directly attached.

Figure 9:
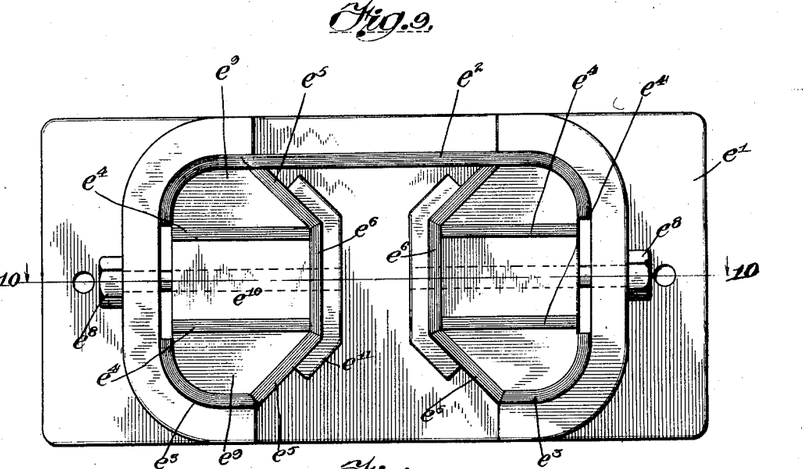
Fig. 9 is a bottom plan of the knives and the block upon which the latter are mounted.
Figure 10:
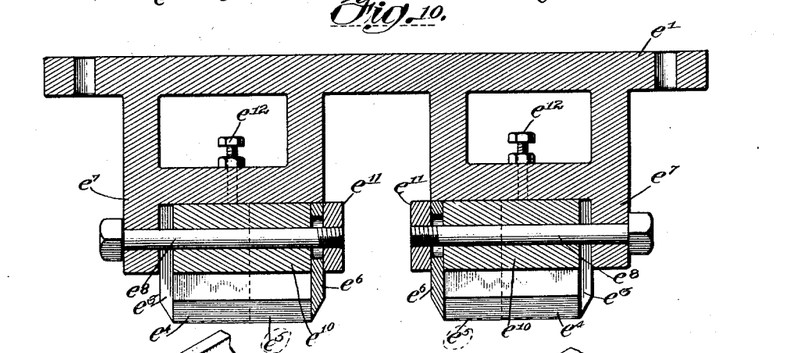
Fig. 10 is a vertical section on line 10—10 in Fig. 9.
Figure 11:
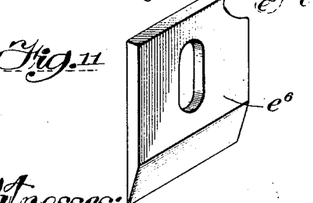
Figs. 11 and 12 are detailed perspective views of the knives involved in the cutting arrangement illustrated by Figs. 9 and 10.
Figure 12:
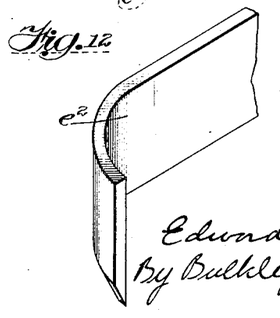
Figures 14, 15:
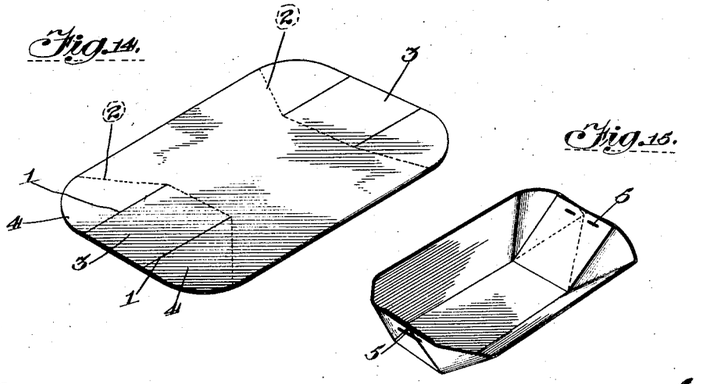
Fig. 14 is a perspective of one of the blanks from which the butter dishes are made.
Fig. 15 is a perspective of a completed butter dish.

With respect to the form of blank shown in Fig. 14, and the consequent necessity of rounding the corners of the blank and making the cuts 1 and the scoring 2, the said knives are arranged as shown in Fig. 9. The knife $e^2$ is curved at each end, so as to cut off a suitable portion of the veneer X, which, it will be seen, is fed to the forming and stapling mechanism over the smooth upper surface of the machine—that is to say, over the horizontal table portion $a^2$ of the frame or body. The other corners of the blank are at the same time rounded by the action of the short curved knives $e^3$, while the cuts 1 are made by the short straight knives $e^4$. The scoring 2 is done by the obliquely arranged knives $e^5$, and by the transversely arranged knives $e^6$. It will be understood that the edges of the different knives are so relatively adjusted that $e^2$, $e^3$ and $e^4$ pass entirely through the wood veneer or paper or other suitable material, while $e^5$ and $e^6$ pass only partly through the said material.

As illustrated, a very satisfactory and efficient arrangement is employed for holding these knives in place. The carrier or block $e'$ to which the knives are directly secured, is preferably provided with knife-seats $e^7$, and it is against these seats that the knives are tightly clamped by the action of the clamping bolts $e^8$. This is accomplished by supporting the knives by means of removable blocks $e^9$ and $e^{10}$, and by providing bent or angularly shaped jaws $e^{11}$ having threaded openings adapted to engage the threaded ends of the bolts $e^8$. It will be seen that a rotation of these bolts will cause the jaws $e^{11}$ to draw the different knives tightly against the opposing or inner faces of the knife-seats $e^7$. The knives $e^4$ can be given a delicate and accurate adjustment by means of the adjusting screws $e^{12}$. Thus the knives are embodied in a unitary and self-contained structure or element of the machine, and this unitary or self-contained knife structure can be removably secured to the cross-piece $e$ by means of bolts or screws $e^{13}$.

Figure 13:
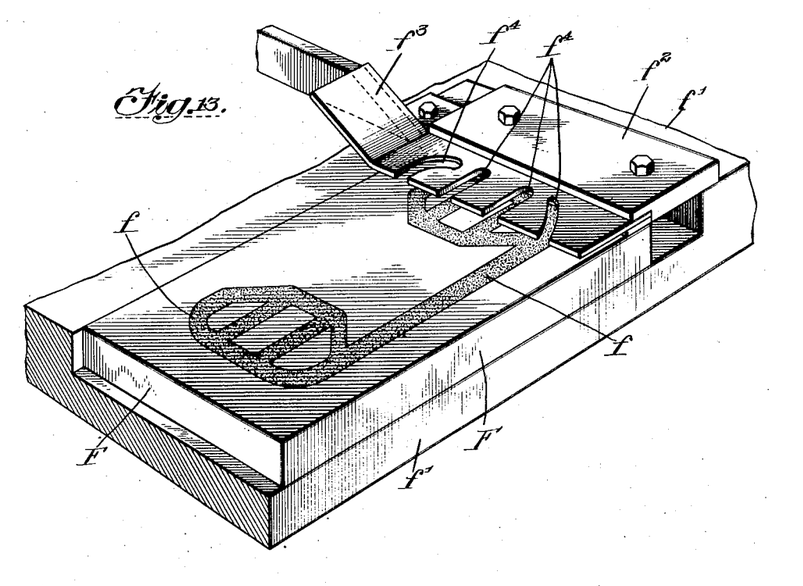
Fig. 13 is a perspective view showing the anvil or table upon which the blanks are cut.

It is, of course, desirable to provide a simple and efficient anvil or device for supporting the veneer or other material while it is being cut—that is to say, an arrangement which will sustain the pressure of the knives. Fig. 13 illustrates a simple and effective arrangement for accomplishing this purpose. It consists, as illustrated, of a block F provided with Babbitt metal adapted to receive the sharp edges of the knives. This Babbitt metal can be run into the block in the manner shown in Fig. 13, so as to provide a narrow strip of metal having the outline of the edges of the knives. It is obvious, however, that this Babbitt metal can be disposed in any suitable or desired manner. The block F is slipped into a seat in the frame or body provided by the cross-piece $f'$, which extends across the machine and is bolted at its ends to the side portions of the frame. As a means for preventing the knives from objectionably pulling or lifting the blanks away from the block F, the machine is preferably provided at each side with plates $f^2$ adapted to reach over and clamp upon the block F, and adapted to provide supports for the guards $f^3$. These guards are, it will be seen, bent up at their rear ends, so as to permit the veneer or other material to slide readily beneath them, and are also provided with openings $f^4$ through which the knives may pass and operate on the material from which the dishes or trays are constructed. Thus it will be seen that the cutting mechanism is of a very simple and efficient form or construction. Both the knives and the anvil or cutting block are readily removable, either for the purpose of repair or substitution, and are susceptible of nice adjustment.

The improved and highly efficient arrangement for feeding the veneer or other suitable material over the table $a^2$, comprises a lever G which is pivoted at its lower end to the frame or body, and which is connected at its upper end with the dog $g$ or device for engaging and shoving the material forward. The said connection between the said lever and dog preferably consists of a link $g'$. As illustrated, the dog $g$ has a foot $g^2$ of a roughened character and adapted to engage and thrust the material forward with uniformity and certainty of action. The said dog is pivoted to a horizontally sliding bar $g^3$, adapted to slide in a bearing formed in the arm $g^4$, which latter can be bolted to the top of the machine. Wear between the top and bottom of the sliding bar $g^3$ and the arm $g^4$ can be taken up by means of adjusting screws $g^5$, the latter bearing down on the top of the sliding bar. A plate $g^6$, together with a piece of material $g^7$, suitable for pressing in the groove $g^9$ of said bar, constitute the means for removably clamping the bar in place in the arm $g^4$, and, with the adjusting screws $g^6$, permit the taking up of wear between the vertical back surface of this bar and the opposing vertical surface of the arm $g^4$. In this way, the bar $g^3$, which is dove-tailed in cross-section, is adapted to slide back and forth and toward and away from the knives and cutting devices. As stated, the dog $g$ is pivotally mounted upon the end of this bar $g^3$, and is adapted to reciprocate in unison with the latter. Consequently, a forward stroke of the lever G will cause the dog $g$ to press hard upon the veneer or other material, and will, at the same time, cause the dog and the bar $g^3$ to slide forward carrying the sheet of veneer or other material with them. The gripping, it will be seen, of the dog on the material is of a positive and certain character, and the arrangement in this way is calculated to produce uniformity and certainty in the feeding action. A back stroke of the lever G then positively lifts the foot of the dog from off the veneer, and at the same time draws the dog and the bar $g^3$ back into a position to again grip the veneer. In this way, the feeding mechanism is adapted to produce an intermittent feeding movement of the veneer beneath the knives.

The means for operating the feeding mechanism comprises an eccentric cam $g^9$, mounted on the drive-shaft C, and provided with an eccentric strap $g^{10}$ having a suitable adjustable connection $g^{11}$ with an intermediate portion of the lever G. Thus a rotation of the shaft C is converted into a vibratory movement on the part of the lever G and a consequent reciprocation of the feeding dog $g$.

The forming mechanism, that is to say, the means for reducing the blank to the form or contour of a dish or tray, consists preferably of an upper die or hollow mold H, mounted immediately beyond the cutting mechanism, and a lower die or solid plunger I. The mold H can be secured to the cross member $h$ of the body or frame, and has a concave underside adapted to receive said plunger. The two side portions of the mold are spaced apart to provide slots for the staplers to work through. As a matter of special improvement, the said die or hollow forming-member is provided with a movable portion $h'$, which normally hangs a distance below the under surface of the mold, and which is adapted to engage the portions 3 of the blank before the stationary or body portion of the mold engages the remaining portions of the blank. It will be seen that the said mold is constructed with two rigidly connected side portions between which the said movable section $h'$ is adapted to move up and down. Thus, in the operation, these portions 3 are first bent down, so as to allow the hollow mold to fold the portions 4 on top, as shown in the completed article. This movable section $h'$ of the mold is supported by rods $h^2$ adapted for vertical reciprocation and held normally down by a spring $h^3$. The said rods serve also to prevent the section $h'$ from turning about a vertical axis. This spring is secured at its lower end to a stationary portion of the frame, and at its upper end to the cross-piece $h^4$ which connects the said rods.

The cross-piece $h^4$ can be provided with a projection $h^5$ adapted to rest normally, or nearly so, upon the rubber cushion or buffer $h^6$. Thus in the operation, the plunger in rising carries the blank upward with it, thereby forcing the mold section $h'$ upward, so as to lap the portions 4 upon the portions 3 of the blank. When the plunger starts down, the spring $h^3$ returns the mold-section $h'$ to its normal or depressed position, and the rubber cushion or buffer $h^6$ at this time acts as a noiseless stop to limit its downward motion. The said plunger I is removably secured to the upper end of the plunger rod or bar $i$, which latter is mounted for vertical reciprocation in a box-like bearing $i'$. The lower end of said plunger rod is connected by a link $i^2$ with the eccentric strap $i^3$ carried by an eccentric cam $i^4$ on the shaft C. This strap $i^3$ is adapted to act as a lever, it having a shifting fulcrum by reason of its connection with the lower portion of the frame or body through the medium of a swinging link $i^5$. It is thus adapted, as stated, to act as a lever, the power being applied between its ends, and its vertical vibratory movement, caused by the rotation of the shaft C and cam $i^4$, causing the vertical reciprocation of the plunger I. During the operation of the machine this form is constantly moving up and down. Now the veneer, during the operation of the machine, is given an intermittent feeding movement beneath the knives, which movement of the veneer serves to not only bring a fresh portion of the veneer beneath the knives, but serves also to push the previously cut blank from beneath the knives and into a position to be caught between the mold H and the form I. The form and mold coming together reduce the blank to the desired form or contour, and at this point the staples 5 are then driven through the end portions of the tray or dish for the purpose of fastening the lapped portions 3 and 4 together.

Figure 6:
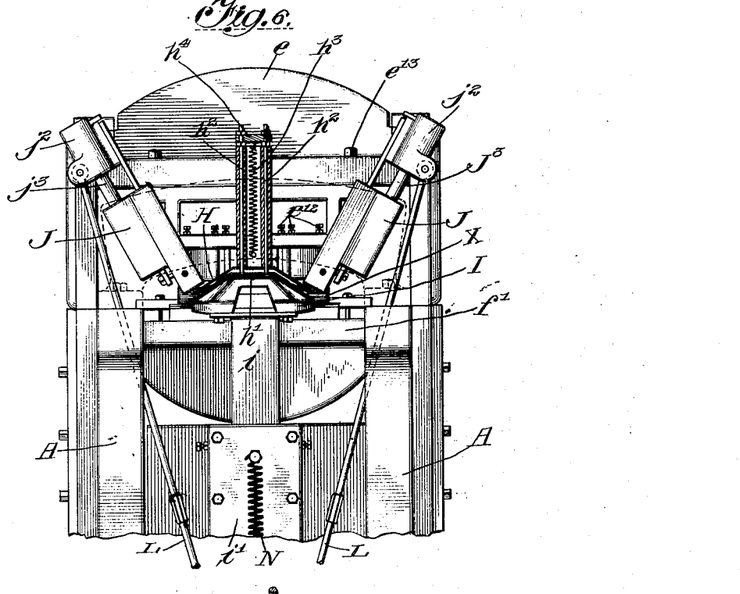
Fig. 6 is a front elevation of the upper portion of the machine, showing the mold or hollow die and adjacent parts, in vertical section.
Figures 7, 8:
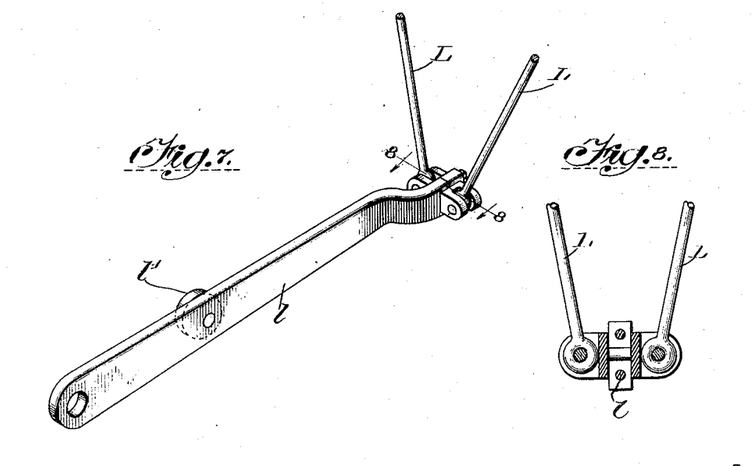
Figs. 7 and 8 are detail views of the lever connections for operating the stapling mechanism.

The stapling mechanism for driving the said staples can be of any suitable known or approved character. For example, two stapling mechanisms J may be employed, as shown more clearly in Fig. 6, these two mechanisms being arranged at opposite sides of the machine, and tilted outward at their upper ends, so as to permit the staples to be driven at right angles to the sloping or beveled end-surfaces of the plunger. As illustrated, each stapling mechanism comprises a staple former $j$ closely and slidingly associated with a staple driver $j'$. The driver, it will be seen, is rigidly secured to the head $j^2$, which latter is carried by the upper end of the rod $j^3$. This rod $j^3$ is mounted for vertical, or substantially vertical, reciprocation in a bearing $j^4$, which is rigidly secured to the frame or body of the machine. On the other hand, the staple former $j$, which is provided with two prongs $j^5$, is yieldingly connected with the head $j^2$ through the medium of a spring $j^6$. The driver $j'$ has an end or driving portion adapted to slide between the said prongs $j^5$ of the staple former. The anvil or loop-bar $j^7$ is removably secured to the lower end of a lever $j^8$, which latter is pivoted to the stationary or body portion $j^9$ of the stapling mechanism. This anvil or loop-bar is, it will be seen, provided with a notch or opening $j^{10}$, adapted to receive the wire Y, as it is fed through and across the lower end of the mechanism, and furthermore this anvil or loop-bar is removably secured to the lever $j^8$ by means of the screw or bolt $j^{11}$. It will be seen that a slight shoulder X at the lower end of the lever prevents the loop bar from turning on the screw. A pin $j^{12}$ on the upper end of the said lever, and the cam finger $j^{13}$ carried by the reciprocating head $j^2$, constitute the means for causing the loop-bar $j^7$ to be alternately thrust into the path of the staple former and driver and removed therefrom. The overhanging portion $j^{14}$ is adapted, it will be seen, to prevent the long middle portion of the staple from bowing or bending upward when it is formed, it being observed, at this juncture that the staples which are used for fastening the ends of the dish are necessarily quite broad.

The simultaneous movement of the staple former and driver is obtained by providing the two with openings which, when they register, are adapted to contain the cylindric portion $j^{15}$ of a short reciprocating pin or shuttle-like member. This short locking pin is adapted to be reciprocated through the staple driver and former by the stationary cams or beveled surfaces $j^{16}$ and $j^{17}$. Thus, when the head $j^2$ reciprocates, it first causes the staple driver and former to move in unison, the short pin or locking member then encountering the cam or bevel $j^{16}$, so as to reciprocate said locking member to an extent to bring its narrow portion $j^{18}$ into the position to slide downward through the slot $j^{19}$. The driver and former then become unlocked, allowing the driver to complete the balance of the stroke alone. In other words, the initial movement of both staple driver and former causes the staple former to bend to cut off a short length of wire and bend it over the loop-bar, and when the staple is thus ready to be driven, the staple driver and former are then unlocked from each other, and the staple driver continuing its movement drives the staple into the material of the dish or tray. Preferably, the wire is fed through a small adjustable tube $j^{20}$, and the lower end of the prong $j^5$ at this side of the mechanism is adapted to act as a knife to shear or cut off a length of wire. The set-screws $j^{21}$ are employed for regulating the pressure of the plate $j^{22}$, which latter bears against the outer sides of the staple former and driver. During the driving of the staple, the lower ends of the prongs $j^5$ rest upon the dish or tray, the spring $j^6$ permitting the staple former to thus remain stationary during the time the staple driver is being moved downward for the purpose of inserting the staple.

Figures 16, 17, 18, 19:
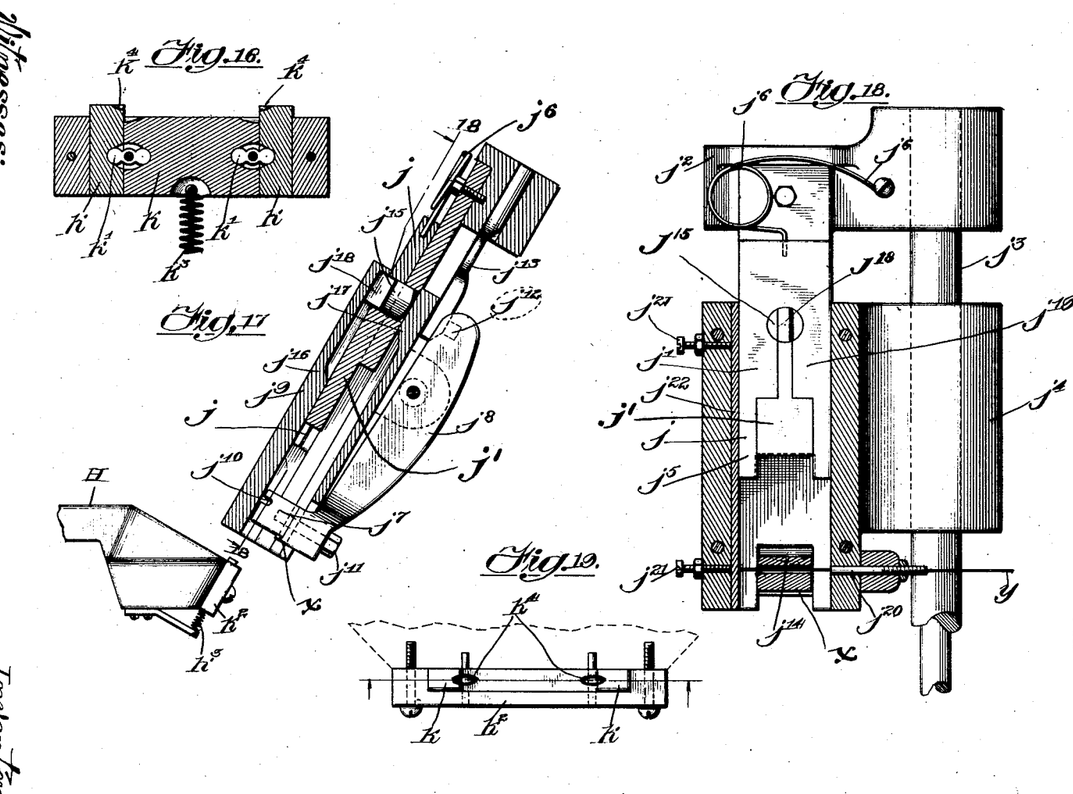
Fig. 16 is a sectional view of the clench-blocks which are mounted on the plunger or form.
Fig. 17 is a vertical sectional view of one of the stapling mechanisms, showing the adjacent portion of the form in elevation.
Fig. 18 is a section on line 18—18 in Fig. 17.
Fig. 19 is a plan of one of the clench-block devices which are secured to the opposite sides of the form or plunger.

Any suitable means can be mounted on the plunger or form I, for the purpose of clenching the ends of the staples. For example, the clench-block arrangement can be of the character shown in Figs. 16 and 19, which are on a much larger scale than Figs. 17 and 18. An arrangement of this character, when employed, is mounted at each end of the form or plunger. Each clenching device consists of a clench-block made in three sections, a long middle section K and two narrow but higher end sections $k$. Pivoted levers $k'$ are employed as the means for supporting the clench-block thus made in sections in place back of the plate $k^2$, which latter is secured to the inclined end of the form, as shown in Figs. 17 and 19. The spring $k^3$ is employed for holding the clench-block sections in their normal positions. When a staple is driven, its points or ends first strike the cavities $k^4$ in the upper ends of the clench-block sections $k$, and the downward pressure on these sections then cause the levers $k'$ to tilt and raise the long middle section K. Thus the points are partially turned, and the middle section K of the clench-block then rises to complete the clenching on the under or concave side of the dish or tray. This is shown quite clearly in Fig. 15. A clench-block arrangement of this character is very efficient and satisfactory in use. It insures a proper clenching of the staple ends.

The means for reciprocating the head $k^2$, and for thereby operating the stapling mechanism, comprises preferably a couple of vertically disposed rods L, having their upper ends connected with the said head, and having their lower ends connected with the end of a pivoted lever $l$. This lever has one end fulcrumed upon the bottom portion of the frame or body, and is provided at its middle portion with a roller or other suitable projection $l'$. A cam $l^2$ is mounted upon the shaft C, and is provided with a cam-groove $l^3$ adapted to receive the roll or projection $l'$. Thus the rotation of the shaft C causes a vertical, or practically vertical, reciprocation on the part of the rods L, through the medium of the vibratory lever $l$. This in turn produces the desired reciprocation of the heads $j^2$, these heads $j^2$ being adapted to either reciprocate upon the rod $j^3$ or to move with the said rods, the latter sliding in bearings $j^4$. These, or other similar arrangements can be employed for securing an even and satisfactory reciprocation of the heads which carry the staple drivers and formers.

It will be observed that the two eccentric arrangements, and also the cam $l^2$, are all so relatively mounted upon the shaft C that the different steps in the operation of making a butter dish occur in their proper sequence. In other words, the forming and stapling devices are forming and stapling a butter dish at the same time that the knives are cutting the next blank.

The feeding of the veneer is, it will be seen, accomplished when the knives are up, and the completed blank is pushed between the mold and form just prior to the time at which these two forming instrumentalities are brought together.

Any suitable arrangement can be employed for feeding the wire Y. For example, the eccentric strap $g^{10}$ can be provided at its other side with an arm M, and this arm can be pivotally connected with the lower end of the rod $m$. To the upper end of the latter is secured a suitable pawl or dog $m'$. This pawl or dog is adapted to engage the ratchet-wheel $m^2$, so as to cause the feeding rolls $m^3$ and $m^4$ to give the wire an intermittent forward feeding movement. When the rod $m$ goes down, the feeding mechanism remains inert, but when the cam $g^9$ revolves to a point to cause this rod $m$ to rise, the feeding rolls are then rotated to an extent to give the wire the proper or desired extent of feed. The spring $m^5$, connecting the rod $m$ to the arm M, can be employed as the means for keeping the pawl or dog $m'$ pressed firmly against the ratchet wheel $m^2$. In this way, the eccentric arrangement which operates the veneer fed is also employed for operating the wire feed. The wire can be held by a reel Z or any other suitable similar device.

The machine thus constructed is simple, compact, and of a very practical and serviceable nature. It is capable of very high speed, and of a consequent rapid production of the trays or dishes, without injurious vibration, and with comparatively little noise. Furthermore, it is capable of thus rapidly turning out the dishes with comparative certainty of action, and without danger of producing imperfect dishes or trays.

It will be understood, of course, that the dishes or trays can be of any suitable or desired construction, and for this reason the machine, by varying the formation of the mold, can be employed for making dishes or trays of any desired shape. The wood, veneer, or paper, or other similar material of which the trays or dishes are to be made, can be held in any suitable manner, and can be arranged in any way that will permit of its being drawn forward and properly fed beneath the knives.

It will be seen that the mold-section $h'$ is adapted to act as an ejector when the plunger or form I descends. In other words, its spring will cause it to eject the finished tray or dish from the hollow mold. The spring N which connects the lever $l$ with the stationary bearing box $i'$ is adapted to maintain the stapling devices in normal positions. Any suitable or approved means can be employed for receiving the finished product from the mold when the plunger goes down.

The scoring knives can, of course, if such is desired, be formed integral—that is to say, the knives $e^5$ can be formed integral with the knives $e^6$, thus making only two scoring knives. It is obvious, however, that this construction and arrangement of knives can be varied or modified in any suitable or desired manner. Furthermore, the staple clenching arrangement shown in Figs. 16 and 17 can be changed or modified more or less, the essential feature consisting of a yielding outside clenching device and a movable center. As illustrated, the outside clenching device consists of the two sections $k, k$, but it is obvious that these two sections can be rigidly connected, so as to move as one member. Other arrangements and constructions are obvious.

Figure 1:
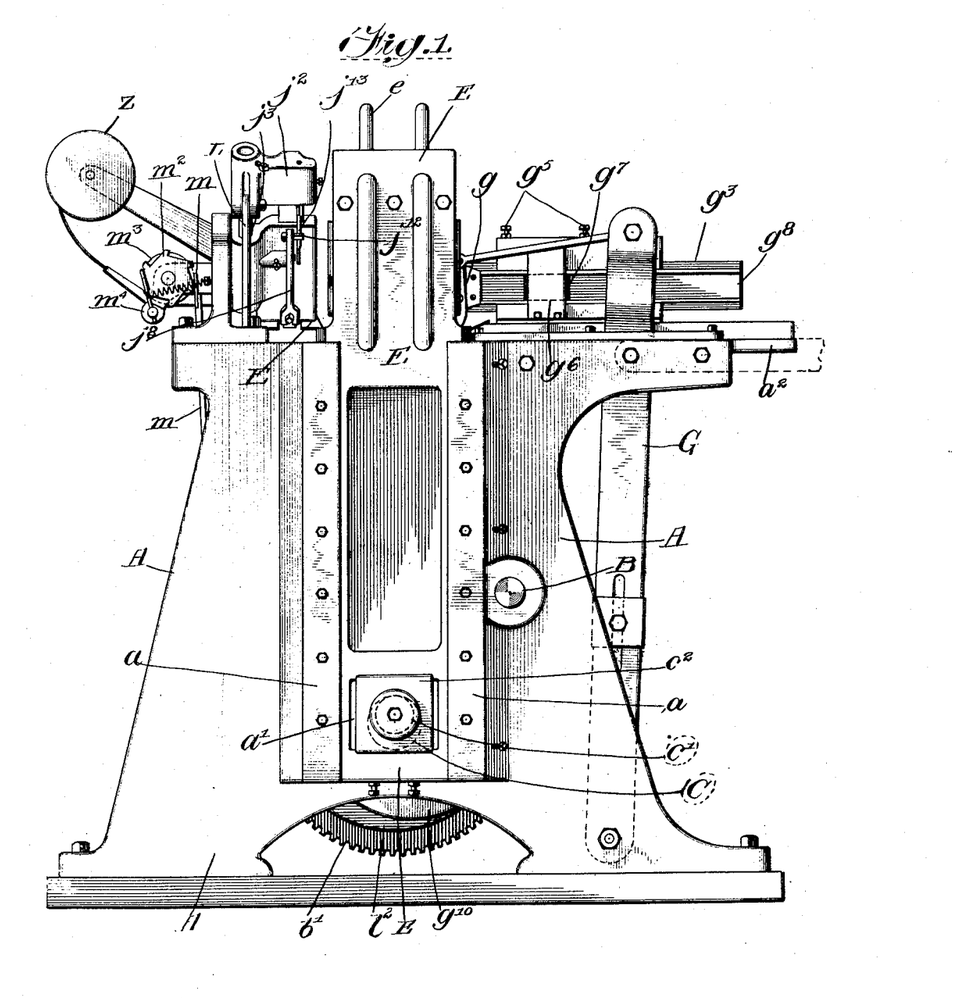
—Figure 1 is a side elevation of an automatic butter dish machine involving the principles of my invention.
Figure 2:
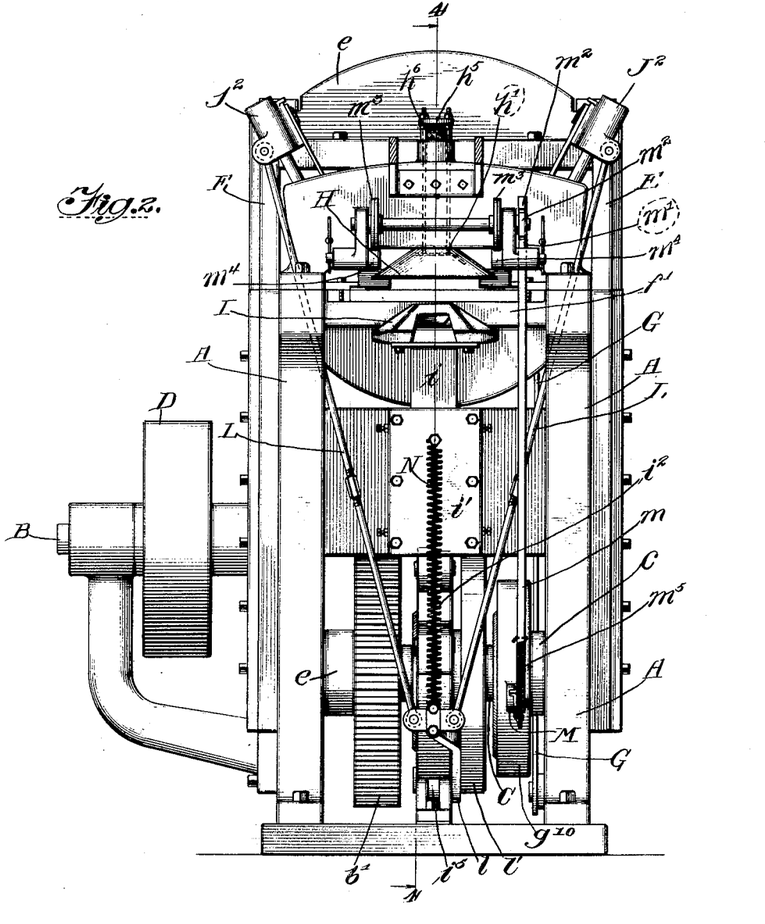
Fig. 2 is a front elevation of the machine shown in Fig. 1.
Figure 3:
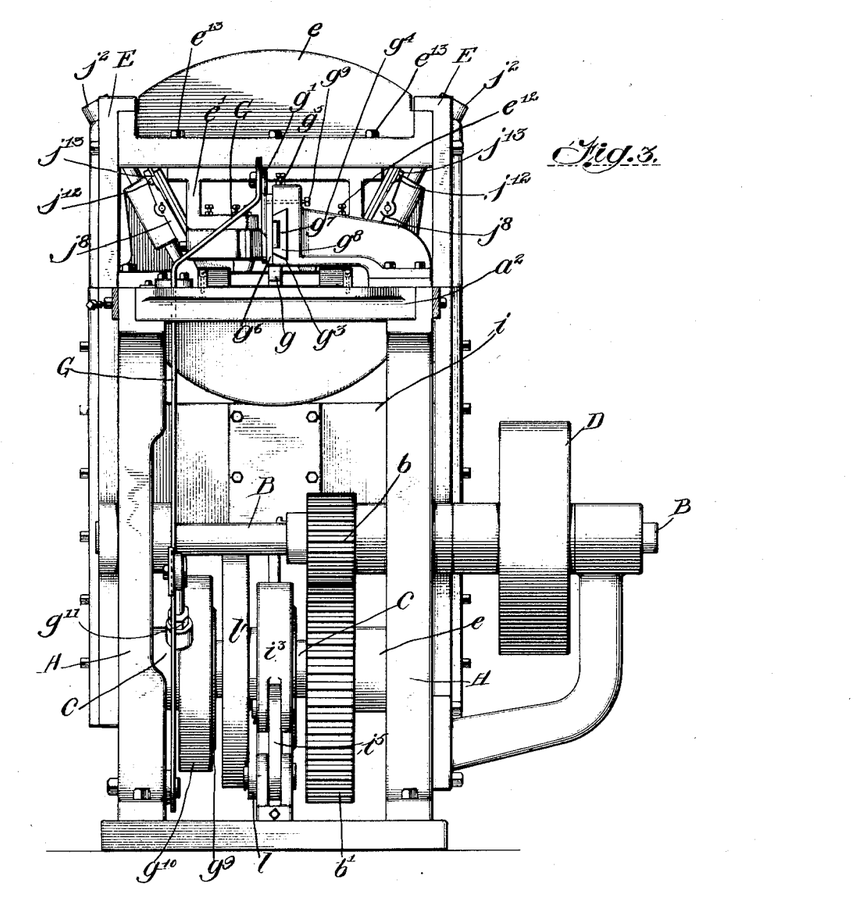
Fig. 3 is a rear elevation of the machine shown in Fig. 1.
Figure 4:
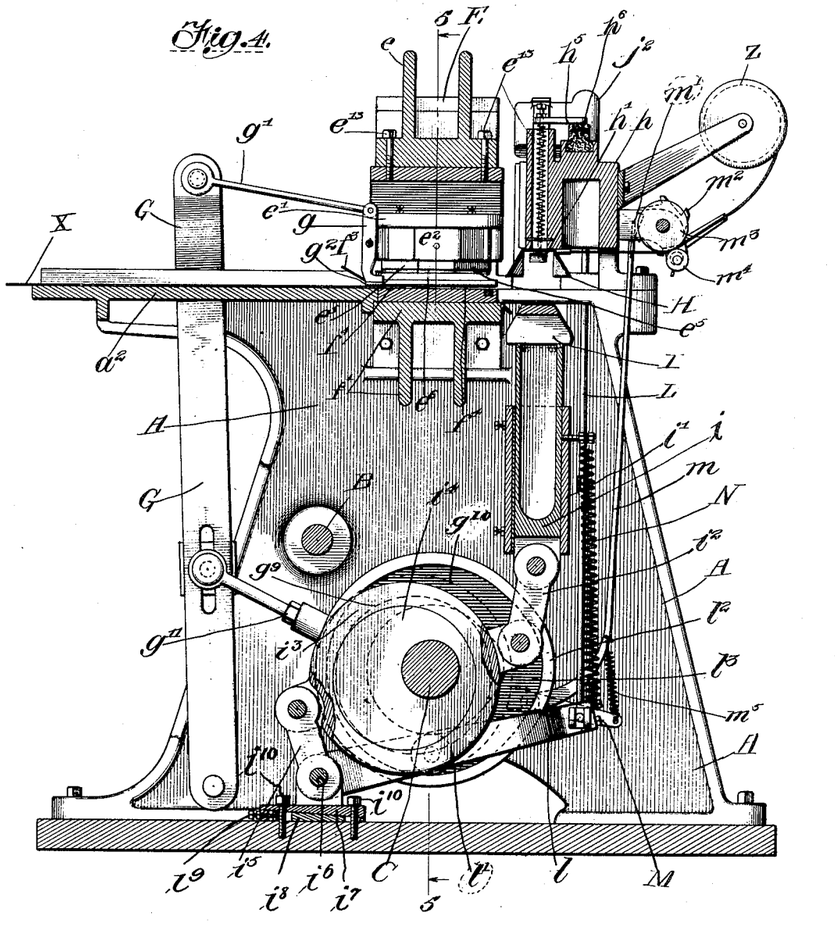
Fig. 4 is a vertical section on line 4—4, in Fig. 2.
Figure 5:
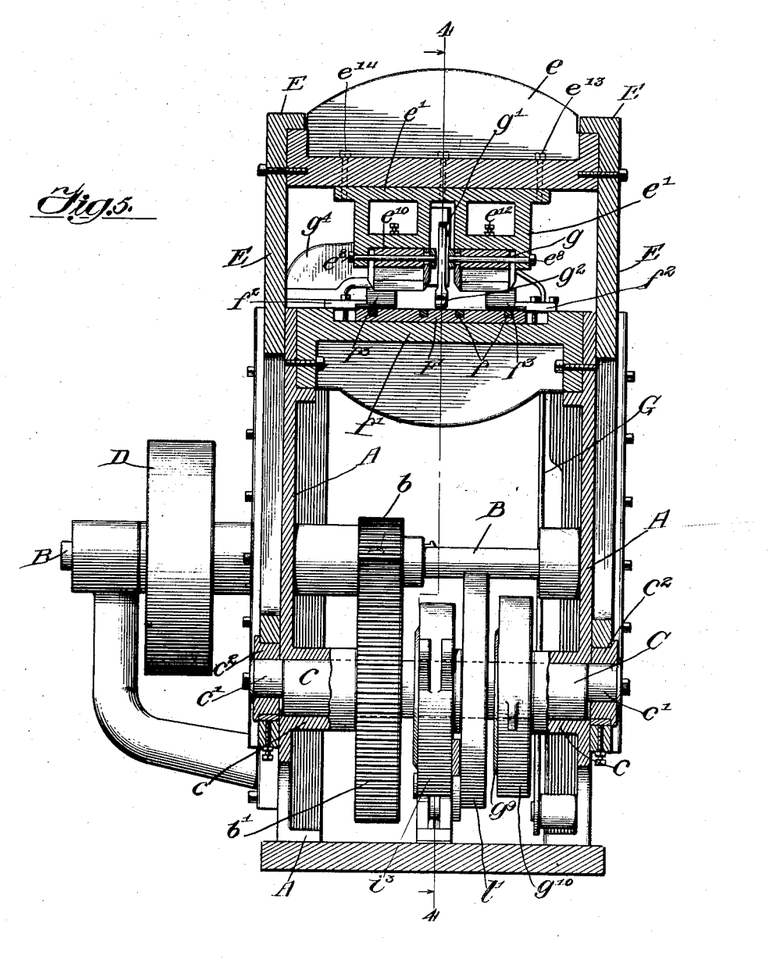
Fig. 5 is a vertical section on line 5—5 in Fig. 4.

In Fig. 4 it will be seen that a link $i^5$ is mounted upon a pivot or axis $i^6$ carried on a block or bracket $i^7$ secured to the base of the machine. This block $i^7$ is supported upon a wedge block $i^8$, which latter is operated by an adjusting screw $i^9$, and the parts are held in place on the base by screws $i^{10}$, whereby the axis $i^6$ can be raised and lowered. This, it will be seen, will serve to regulate the operation of the vertically reciprocating plunger or form. The lever $l$ is also pivoted or fulcrumed upon the pin or axis $i^6$, so that this lever and the said link have a common axis.

I claim as my invention:—

1. A machine for making dishes, comprising devices for feeding and cutting the material, devices for forming and stapling the dishes, devices for feeding the wire, and means for operating all of said devices; said means including a shaft provided with reduced eccentric end portions, vertically reciprocating members connected with the said cutting devices and provided with ways, and blocks mounted on said eccentric end portions and adapted to reciprocate horizontally in said ways provided in the lower end portions of said vertically reciprocating members.

2. A machine for making dishes, comprising devices for feeding and cutting the sheet material, devices for forming and stapling the dishes, devices for feeding the wire, and means for operating all of said devices; said means including a lever fulcrumed at its lower end and connected at its upper end with the device for feeding the sheet material, and an eccentric device connected with an intermediate portion of said lever, together with a shaft having its ends connected with said cutting device, the said eccentric device being mounted upon an intermediate portion of the shaft, and the said stapling and wire-feeding devices being also connected with intermediate portions of said shaft, the said lever being disposed at one side of the path of travel of the sheet material, but having its upper end portion bent toward the center of the machine, whereby the sheet material passes below the upper portion of the lever.

3. A machine for making dishes, comprising devices for feeding and cutting the sheet material, dish-forming and stapling devices, wire-feeding devices, and means for operating all of said devices; said means including an upright lever fulcrumed at its lower end and connected at its upper end with the device for feeding the sheet material, a drive shaft connected at its ends with the said cutting device, an eccentric cam mounted on an intermediate portion of said shaft, and an eccentric strap on said cam connected with an intermediate portion of the said lever, the said lever being disposed at one side of the path of travel of the sheet material, but having its upper end portion bent toward the center of the machine, whereby the sheet material passes below the upper portion of the lever.

4. A machine for making dishes, comprising devices for feeding and cutting the sheet material, dish-forming and stapling devices, wire-feeding devices, and means for operating all of said devices; said means including an eccentric cam and fulcrumed strap adapted for operating the dish-forming devices, together with a shaft having its ends connected with said cutting device, the said cam being mounted upon an intermediate portion of the shaft, and the said stapling devices being also connected with an intermediate portion of said shaft.

5. A machine for making dishes, comprising devices for feeding and cutting the sheet material, dish-forming and stapling devices, wire-feeding devices, and means for operating all of said devices; said means including a drive shaft connected at its ends with the said cutting device, an eccentric cam on said shaft, an eccentric strap on said cam, a link connecting one side of said strap with a stationary portion of the machine, and another link connecting the other side of said strap with the said dish-forming devices, together with means for connecting the said stapling and wire-feeding devices with intermediate portions of said shaft.

6. A machine for making dishes, comprising devices for feeding and cutting the sheet material, dish-forming and stapling devices, wire-feeding devices, and means for operating all of said devices; said means including a drive shaft connected at its ends with the said cutting device, a cam on an intermediate portion of said shaft, a lever pivoted at one end to a stationary portion of the machine and connected at its other end with the said stapling devices, and a projection on said lever adapted to engage said cam, together with means for connecting all of the said feeding devices with intermediate portions of said shaft.

7. A machine for making dishes, comprising devices for feeding and cutting the sheet material, dish-forming and stapling devices, wire-feeding devices, and means for operating all of said devices, said means including a single eccentric-cam-and-strap device common to and connected for operating all of said feeding devices.

8. A machine for making dishes, comprising devices for feeding and cutting the sheet material, a table for supporting the sheet material in a horizontal plane, dish-forming and stapling devices, wire-feeding devices, and means for operating all of said devices, said dish-forming devices including a stationary mold provided with a bodily movable section having fingers adapted to engage certain portions of the material before the balance of the latter is engaged by the other parts of the said mold, together with a vertically reciprocating form, said mold having rigidly connected side portions between which said bodily movable section is adapted to move up and down, the ends of said side portions spaced apart to provide slots for the said stapling devices to work through.

9. A machine for making dishes, comprising devices for feeding and cutting the sheet material, dish-forming and stapling devices, wire-feeding devices, and means for operating all of said devices, said dish-forming devices including a stationary mold provided with a spring-backed and bodily movable lower section having fingers adapted to engage and operate upon certain portions of the blank formed by the cutting devices, before the balance of the blank is engaged by the other parts of said mold, together with a vertically reciprocating form below said mold, said mold having rigidly connected side portions between which said bodily movable section is adapted to move up and down, the ends of said side portions spaced apart to provide slots for the said stapling devices to work through.

10. A machine for making dishes, comprising devices for feeding and cutting the sheet material, dish-forming and stapling devices, wire-feeding devices, and means for operating all of said devices; said cutting devices including a single pair of jaws and a plurality of removable cutting and scoring knives all clamped in place by said single pair of jaws bearing against the scoring knives, said knives being mounted for reciprocation.

11. A machine for making dishes, comprising devices for feeding and cutting the sheet material, dish-forming and stapling devices, wire-feeding devices, and means for operating all of said devices; said cutting devices including a single pair of bolts, and a plurality of cutting and scoring knives all removably held in place by said single pair of clamping bolts passing through the scoring knives, the knives being separated from each other by removable blocks, said knives being mounted for reciprocation.

12. A machine for making dishes, comprising devices for feeding and cutting the sheet material, dish-forming and stapling devices, wire-feeding devices, and means for operating all of said devices; said cutting devices including a relatively long knife with curved end portions, two short curved knives, four straight knives for making the cuts in the blank, two knives for scoring the blanks, and a pair of bolts passing through the scoring knives and adapted for removably clamping all of said knives in place, said knives being mounted for reciprocation.

13. A machine for making dishes, comprising devices for feeding and cutting the sheet material, dish-forming and stapling devices, wire-feeding devices, and means for operating all of said devices; said cutting devices including vertically reciprocating knives and a removable plate arranged below said knives, together with guards overlying the plate and provided with openings through which the knives can pass, said plate being provided with Babbitt metal adapted to make contact with the edges of said knives, and the said plate being removable independently of the said guards.

14. A machine for making dishes, comprising devices for feeding and cutting the sheet material, dish-forming and stapling devices, wire-feeding devices, and means for operating all of said devices; said devices for feeding the sheet material including a vibratory lever, a horizontally reciprocating bar, a dog pivotally mounted upon said bar and adapted to engage the material, and a link connecting said lever with the upper end of said dog, said lever being pivotally supported at its lower end and pivotally connected with said link at its upper end.

15. A machine for making dishes, comprising devices for feeding and cutting the sheet material, dish-forming and stapling devices, wire-feeding devices, and means for operating all of said devices; said dish-forming devices including a form provided with clench-blocks, each clench-block being made in three sections, springs for maintaining said clench-block sections in their normal positions, and short levers connecting the intermediate section of each clench-block with the relatively narrow end sections.

16. A machine for making dishes, comprising devices for feeding and cutting the sheet material, dish-forming and stapling devices, wire-feeding devices, and means for operating all of said devices, said stapling devices including a pair of levers provided with removable loop-bars, said levers disposed obliquely to each other, each loop-bar having a portion adapted to rest on top of the middle portion of the staple while the ends of the latter are being bent into shape, and each lever having a screw $j^{11}$ by which said loop-bar is secured thereto, the heads of said screws being accessible from the outer sides of the loop-bars, and the levers having shoulders to prevent the loop-bar from turning on said screws.

17. A machine for making dishes, comprising devices for feeding and cutting the sheet material, dish-forming and stapling devices, wire-feeding devices, and means for operating all of said devices; said stapling devices comprising a pair of staple formers arranged at opposite sides of the dish-forming devices, a staple-driver associated with each staple-former, a loop-bar arranged at the outer side of each staple-driver, cam fingers for operating said loop-bars, a short pin adapted to reciprocate transversely through each staple-driver, stationary cams for operating said reciprocating pins, and springs for yieldingly connecting the staple-formers with the staple-drivers, each staple-former and its associated staple-driver being tilted or inclined outwardly.

18. A machine for operating on sheet material, comprising suitable devices for feeding and cutting the sheet material, and means for operating said devices; said feeding devices including a vibratory lever, a horizontally reciprocating bar, a dog pivotally mounted upon the side of said bar and having its lower end adapted to engage the sheet material, and a link connecting the upper end of said lever with the upper end of said dog.

19. A machine for operating on sheet material, comprising suitable devices for feeding and cutting the material, suitable wire-feeding devices, suitable staple forming and driving devices, and a clenching device; said clenching device comprising yielding outside clenching means and a movable center, the center and outside means being connected by pivoted levers.

20. A machine for making dishes, comprising suitable devices for feeding and cutting the sheet material, means for feeding the wire and forming and driving the staples, a clench-block comprising outer upright portions and an intermediate portion, suitable connection between the outer and intermediate portions whereby a downward movement of the outer portions is accomplished by an upward movement on the part of the intermediate portion, and spring means tending normally to hold the outer portions up and the intermediate portion down.

21. A machine for making dishes, comprising devices for feeding and cutting the sheet material, means for feeding the wire and forming and driving the staples, a clench-block comprising outside portions and an intermediate portion, the intermediate portion being capable of movement relatively to the outside portions, a plate covering and holding the said portions in place, and means including a spring tending normally to hold the outside portions up and the intermediate portion down.

22. A machine for making dishes, comprising devices for feeding and cutting the sheet material, means for feeding the wire and forming and driving the staples, a clench-block comprising outside portions and an intermediate portion, short levers interposed between the outside portions and the intermediate portion, and spring means tending normally to hold the outside portions up and the intermediate portion down.

23. A machine for making butter-dishes, comprising a stationary mold and a movable form, means for feeding the sheet material, means for cutting the material into suitable blank form, a pair of stationary and downwardly converging bearings, loop-bars suitably mounted on said bearings, supporting members mounted for reciprocation in said bearings, a head secured to the upper end of each supporting member, a staple-former and staple-driver carried by each head, the said staple-formers and loop-bars being adapted to coöperate in bending the wire into staple-form, means for feeding the wire, and power-operated devices for reciprocating said heads, said power-operated devices including a single lever to which both of said heads are connected.

24. A machine for making butter-dishes, comprising suitable devices for feeding the sheet material, suitable devices for cutting the material into blank form, a mold and a form adapted to coöperate in reducing the blanks to the proper shape, two heads mounted for reciprocation, a staple-former and a staple-driver carried by each head, a pair of loop-bars each adapted to coöperate with one of said staple-formers in bending the wire into staple-form, a lever pivoted at one end, two downwardly converging rods connecting said heads with the other end of said lever, there being a projection on said lever intermediate of its ends, and a power-operated cam adapted to engage said projection, together with means for feeding the wire.

25. A machine for making dishes, comprising suitable means for feeding and cutting the sheet material, suitable devices for forming the dishes, suitable means for forming and driving the staples, means for feeding the wire, and suitable power-operated means for operating all of said means and devices, the said means for cutting the sheet material comprising a reciprocating member provided with a plurality of knives, and provided also with a plurality of combined clamping and separating blocks for the knives, together with a pair of adjustable jaws operated by a pair of rotary screw-threaded members for clamping said knives and blocks in place, said screw-threaded members when adjusted being adapted to draw the said jaws in opposite directions.

26. A machine for making dishes, comprising a pair of staplers, a stationary mold having a concave under surface, a vertically reciprocating form having its top adapted to fit into the said mold, the mold having a bodily movable middle section held normally in a slightly depressed position by a spring, means for supporting said section, serving also to keep said section from turning about a vertical axis, said mold having end slots for the staplers to work through, means including a rubber cushion for yieldingly limiting the downward movement of the bodily movable section of the mold, and means for limiting the upward motion of said section, when the dish is fully formed, said mold having rigidly connected side portions between which said bodily movable section is adapted to move up and down.

27. A machine for making dishes, comprising an upright body frame having vertical side portions, a base therefor, instrumentalities carried by the upper portion of the frame for feeding and cutting the sheet material, and for forming and stapling the dishes, a shaft having its end portions mounted to rotate in bearings provided in the lower portions of the frame, below the cutting and feeding and stapling devices, and a plurality of cam devices all mounted on the said shaft and disposed side by side between the said bearings, and all suitably connected above for operating the aforestated means for feeding and cutting and forming and stapling, the cam for the stapling devices being disposed between the cams for the forming and feeding devices, and said stapling cam having an element pivoted on said base.

28. A machine for making dishes, comprising a suitable body frame having a table whereon the sheet material is fed, means for cutting the sheet material, means for forming and stapling the dishes, an arm mounted on one side of said body frame and projecting substantially to the center of said table, a reciprocating bar mounted on the end of said arm, a dog carried by said reciprocating bar and adapted to engage the sheet material resting on the table, a vertically disposed lever fulcrumed at its lower end and having its upper end portion bent over and across the said table to permit its upper end to connect with and reciprocate the said bar, and a cam device connected with an intermediate portion of said lever, whereby the sheet material passes under the arch formed by the said arm and lever.

29. A machine for making dishes, comprising suitable means for feeding and cutting the sheet material, suitable means for forming and stapling the dishes, suitable devices for feeding the wire, a rotary shaft, a cam on said shaft, an eccentric strap on said cam, a link connecting said strap with the dish-forming means, another link connecting said strap with a stationary axis, a lever having one end also connected with said axis, rods connecting the other end of said lever with the means for forming and driving the staples, and a cam on said shaft for operating said lever.

30. A machine for making dishes, comprising a stationary mold having a concave lower surface, a vertically reciprocating form having a convex upper surface adapted to enter the said mold, means for operating the form, a pair of vertically disposed and up and down movable rods, said mold having a bodily movable section secured to the lower ends of said pair of vertically disposed and movable rods, said rods being connected at their upper ends, means including a spring for holding said rods and bodily movable mold section in a normally depressed position, the end of said mold being divided to admit the said movable section, means for limiting the upward movement of said section and rods, when the dish is fully formed, and a hollow support between said rods inclosing said spring.

31. A machine for making dishes, comprising a stationary mold having a concave under surface, a vertically reciprocating form having a convex upper surface adapted to enter said mold, said form being mounted on the upper end of a vertically reciprocating member, a rotary shaft, a cam on said shaft, an eccentric strap on said cam, a link connecting one side of said strap with the lower end of said vertically reciprocating member, a stationary axis, and another link connecting the other side of said strap with said axis.

32. In a butter dish machine, a mold, a form coöperating therewith, a knock-out for the mold, adapted to be raised by the form, a spring for operating the knock-out to dislodge the dish from the mold when the form moves down, forming fingers on said knock-out, and a support for said form which reciprocates on the line of movement of said knock-out.

33. In a dish-forming machine, a forming mechanism having a movable form, and an actuating mechanism therefor, whereby the said form is operated, said actuating mechanism comprising an eccentric device, an operating link connecting the device to said forming mechanism, a base, and a fulcrum link connecting the said device with said base, said fulcrum link having one end pivoted on the said strap and the other end on said base.

34. In a dish-forming machine, a forming mechanism having a movable form, and an actuating mechanism therefor, whereby the said form is operated, said actuating mechanism comprising an eccentric device, an operating link connecting the device to said forming mechanism, a base, a fulcrum link connecting the said device with said base, and means on the base for adjusting said fulcrum link to regulate the forming mechanism, said fulcrum link having one end pivoted on the said strap and the other end on said base.

35. In a dish-forming machine, a forming mechanism having a movable form, and an actuating mechanism therefor, whereby the said form is operated, said actuating mechanism comprising an eccentric cam and strap device, an operating link connecting the device to said forming mechanism, a base, a fulcrum link connecting the said device with said base, said fulcrum link having one end pivoted on the said strap and the other end on said base, a pair of stapling heads disposed at opposite sides of said forming mechanism, a lever fulcrumed at the axis of said fulcrum link, connections from the stapling heads to the said lever, said connections comprising a pair of rods which converge downwardly to the free end of said lever, and a cam for operating said lever, said eccentric and free end of said lever being at the center of the machine and in line with each other.

36. In a dish-forming machine, a forming mechanism having a movable form, and an actuating mechanism therefor whereby the said form is operated, said actuating mechanism comprising an eccentric cam and strap device, an operating link connecting the device to said forming mechanism, a base, a fulcrum link connecting the said device with said base, said fulcrum link having one end pivoted on the said strap and the other end on said base, a pair of stapling heads disposed at opposite sides of said forming mechanism, a lever fulcrumed at the axis of said fulcrum link, connections from the stapling heads to the said lever, said connections comprising a pair of rods which converge downwardly to the free end of said lever, a cam for operating said lever, said eccentric and free end of said lever being at the center of the machine and in line with each other, and means for raising and lowering the common axis of said lever and fulcrum link.

37. In a machine for forming and making receptacles, a forming mechanism having a movable form, an eccentric cam and strap, an operating link from the said mechanism to the said strap, whereby the said form is operated, a base, and a fulcrum link from the strap to the base, said fulcrum link having one end pivoted on the said strap and the other end on said base.

Signed by me at St. Joseph, Berrien county, Michigan, this 11th day of September, 1903.

EDWARD CRAIG.

Witnesses:
A. H. BROWN,
R. H. BROWN.